United States Patent [19]

Chuang

[11] Patent Number: 5,082,647
[45] Date of Patent: Jan. 21, 1992

[54] PRODUCTION OF HYDROGEN PEROXIDE

[75] Inventor: Karl T. Chuang, Edmonton, Canada

[73] Assignee: Atomic Energy of Canada Limited, Chalk River, Canada

[21] Appl. No.: 426,034

[22] Filed: Oct. 24, 1989

[30] Foreign Application Priority Data

Oct. 24, 1988 [CA] Canada ................................ 581080

[51] Int. Cl.$^5$ ............................................. C01B 15/01
[52] U.S. Cl. .................................................. 423/584
[58] Field of Search ................. 423/584; 502/159, 158, 502/185

[56] References Cited

U.S. PATENT DOCUMENTS

| | | | |
|---|---|---|---|
| 3,336,112 | 8/1967 | Hooper | 423/584 |
| 3,361,533 | 1/1968 | Hooper | 423/584 |
| 4,007,256 | 2/1977 | Kim et al. | 423/584 |
| 4,009,252 | 2/1977 | Izumi et al. | 423/584 |
| 4,171,350 | 10/1979 | Sanders | 423/219 |
| 4,279,883 | 7/1981 | Izumi et al. | 423/584 |
| 4,336,238 | 6/1982 | Dalton, Jr. et al. | 423/584 |
| 4,336,239 | 6/1982 | Dalton, Jr. et al. | 423/584 |
| 4,336,240 | 6/1982 | Moseley et al. | 423/584 |
| 4,389,390 | 6/1983 | Dalton, Jr. et al. | 423/584 |
| 4,462,978 | 7/1984 | Brill | 423/584 |
| 4,631,263 | 12/1986 | Mizomoto et al. | 502/159 |
| 4,661,337 | 4/1987 | Brill | 423/584 |
| 4,681,751 | 7/1987 | Gosser | 423/584 |
| 4,751,068 | 6/1988 | Bickar et al. | 423/437 |
| 4,772,458 | 9/1988 | Gosser et al. | 423/584 |

FOREIGN PATENT DOCUMENTS

| | | | |
|---|---|---|---|
| 567653 | 12/1958 | Canada . | |
| 771563 | 11/1967 | Canada | 23/62 |
| 1057027 | 6/1979 | Canada | 23/287 |
| 1135940 | 11/1982 | Canada . | |

Primary Examiner—Wayne A. Langel
Attorney, Agent, or Firm—Burns, Doane, Swecker & Mathis

[57] ABSTRACT

This invention relates to a process for manufacturing hydrogen peroxide by the direct oxidation of hydrogen and oxygen in an acidic aqueous medium. The process comprises supplying a catalyst consisting of at least one group VIII metal on a hydrophobic support, and contacting the catalyst with hydrogen and oxygen in an acidic aqueous solution at a hydrogen partial pressure from about 0.3 kPa to 5 MPa and an oxygen partial pressure of 20 kPa to 5 MPa and at a temperature from the freezing point of the aqueous medium to 60° C.

8 Claims, No Drawings

PRODUCTION OF HYDROGEN PEROXIDE

This invention relates to the production of hydrogen peroxide by the direct combination of hydrogen with oxygen over a catalyst comprising at least one group VIII noble metal, in which the reaction is carried out in an acidic aqueous solution.

BACKGROUND OF THE INVENTION

Hydrogen peroxide is a powerful oxidizing agent. It is widely used in bleaching, preparation of chemicals, pollution control, mining and power generation. It is particularly ecologically desirable as a pollution control agent, since it yields only water and/or oxygen upon decomposition.

Most commercial production of hydrogen peroxide is by processes based on the electrolysis of sulphuric acid solution, or the autoxidation of isopropyl alcohol and anthraquinones. It is known to conduct direct oxidation of hydrogen and oxygen in an acidic aqueous solution, using a group VIII noble metal catalyst. Examples of such process are shown in U.S. Pat. Nos. 4,462,978 and 4,661,337 of Brill and U.S. Pat. No. 4,681,751 of Gosser. However, yields in such a process are very low, unless high pressures are used to increase hydrogen and oxygen solubilities and to reduce transfer limitations. High pressures complicate the process by requiring pressure vessels. Further, the carrying out of the process at high pressures increases the risk of explosion.

It is therefore important to develop a process which manufactures hydrogen peroxide at ambient or near ambient temperatures, and at ambient or near ambient pressures.

The present invention accomplishes this by making use of group VIII metal catalysts on a hydrophobic support.

Hydrophobic catalyst supports are already known for other purposes. For example, U.S. Pat. No. 4,025,560 of Rolston et al. shows a catalyst for the exchange of hydrogen isotopes between a gas stream and a water stream where the catalyst is an inherently hydrophobic material such as cubes of polytetrafluorethylene (PTFE), polyethylene or the like. European Patent application 0015585 of Hitachi Inc. shows catalysts similar to those of Rolston for other types of gas-liquid reactions. An activated carbon catalyst which has been reacted with a monomer which forms hydrophobic polymers, is disclosed for carbon monoxide oxidation in U.S. Pat. No. 4,652,537 of Tamura.

Hydrophobic catalysts of this sort have not previously been proposed for the production of hydrogen peroxide. They provide the advantage of much higher yields at ambient pressures and temperatures than previous catalysts used for reaction in an acidic solution. While it is not desired to limit the application by reliance on a particular mechanism of the reaction, ti is believed that the hydrophobic material allows the hydrogen and oxygen to reach the metal sites directly by gas phase diffusion, thus eliminating mass transfer limitations.

BRIEF DESCRIPTION OF THE INVENTION

The invention relates to a process for manufacturing hydrogen peroxide by the direct reaction of hydrogen and oxygen in an acidic aqueous medium, which process comprises supplying a catalyst consisting of at least one group VIII metal on a hydrophobic support, and contacting the catalyst with hydrogen and oxygen in an acidic aqueous solution at a hydrogen partial pressure from about 0.3 kPa to 5 MPa, and an oxygen partial pressure from 20 kPa to 5 MPa at a temperature from the freezing point of the solution to about 60° C. Generally a stoichiometric excess of oxygen over hydrogen will be used, as the oxygen can be supplied as air, which is of course cheaper than hydrogen.

The catalyst is deposited on a hydrophobic support. The hydrophobic support must have a surface area of at lest 50 meters per gram, and can have a surface area as high as 1,500 meters per gram. It can be selected from the group of inherently hydrophobic plastic materials such as styrene divinylbenzene ("SDB"), polytetrafluoroethylene ("PTFE"), polyethylene or polypropylene or silicalite (a silica having a highly structured lattice which is described in U.S. Pat. No. 4,061,724 dated Dec. 6, 1977). Alternatively, the hydrophobic support can be initially hydrophilic material which has been chemically treated as to render it hydrophobic. For example, silica, carbon and fumed silica (such as that produced by Cabot Corp. under the name CAB-O-SIL EH-5) can be rendered hydrophobic by treatment with a silane, fluorine. Treatment with tetrafluoroethylene monomer can also be used to render the support hydrophobic, in the case of those supports which form reasonably strong bonds with tetrafluoroethylene.

One convenient way of determining the hydrophobicity of a solid material, and hence its suitability as a support is by measuring its "contact angle" according to Young's Theory. The support materials which are useful must have a contact angle of at least 30°, although materials with a contact angle of at least 50° are preferred. For best results, a material with a contact angle of at least 90° is preferred.

The support material can be present as discrete particles or granules, or it can be deposited on a second support such as a ceramic or a metal screen. For example, the support material can be deposited on conventional screens, plates, ceramic beads, saddles or rings. Preferably, the discrete particles of the hydrophobic support material can be attached to the second support by means of a liquid-water-repellent, water vapor permeable, coating of an organic resin or polymer. The coating may be of polytetrafluoroethylene or a silicone. Suitable silicones for example, are poly-siloxanes such as polyalkylsiloxanes. The silicone may also include at least one substituent selected from the ethyl, propyl, isopropyl and t-butyl groups.

The catalyst is a Group VIII metal, with Pt or Pd or Ru being preferred. If desired, the catalyst may be a combination of Pt or Pd with another metal from Group VIII.

The group VIII metal is deposited on the hydrophobic support material in a known manner, such as by slurrying the support material in a solution of a chloride of the desired Group VIII metal.

The process of the present invention can be carried out at temperatures from the freezing point of the aqueous solution to about 60° C. The freezing point will of course vary with the solute concentration and pressure but will usually be below about −15° C. The preferred temperature range is from −10° C. to +40° C. Operation at or near ambient temperature (i.e., 10° C.-30° C.) is particularly preferred, as the apparatus does not then require heating or cooling means.

The process of the invention is carried out with a partial pressure of hydrogen from about 0.3 kPa to 5

PMa and a partial pressure of oxygen from about 20 kPa to 5 MPa. Gases which do not react with hydrogen or oxygen, or with each other, can also be present. Conveniently, the oxygen is provide as air, and the reaction is carried out at ambient pressure, which avoids the necessity of using pressure vessels.

The invention will be further described with respect to the following example.

A hydrophobic carbon powder (Cabot Corp. RC-72, [T. M.]), with a surface area of about 300 m$^2$/g was platinized to 2% by weight Pt by treatment with H$_2$PtCl$_6$ in ethanol. It was aligned at 200° C. under helium flow and reduced in hydrogen flow at 200° C. for one hour.

The platinized carbon powder was then slurried in water with a 20% solution of Triton X-100 [T. M.] surfactant (from J. T. Baker Chemical Co.). Polytetrafluoroethylene dispersion (duPont TEFLON 30 [T. M.], which is a 66% dispersion of PTFE in water) was added to the slurry, and the mixture was used to coat 6 mm. diameter ceramic rings. The water was removed by gentle heating while rotating the reaction flask. The product was then heated at 150° C. in air to remove the surfactant, then heated at 360° C. for 15 minutes. The resulting hydrophobic catalyst has a composition by weight of 10% carbon, 3% polytetrafluorethylene, 0.2% platinum, and the remainder ceramic rings.

A one inch diameter trickle bed reactor made of PYREX. (T. M.) heat resistant glass was packed with 40 cm$^3$ of hydrophobic catalyst and was operated at 25° C. and 1 atmosphere. The feed gas was air containing 3% hydrogen by volume and the total flow rate was 6.5 L/h. An aqueous solution containing 1 N H$_2$SO$_4$ and 0.03 N HCl was circulated through the reactor and the flow rate was 0.6 L/h. The total volume of the solution was 100 cm$^3$. Both gas and liquid streams were introduced at the top of the column and flowed concurrently downward to avoid flooding in the packed bed. The liquid loop was constructed of PTFE to avoid corrosion and to reduce the likelihood of side reactions which would decompose H$_2$O$_2$. The concentration of hydrogen peroxide was determined by titration with KMnO$_4$, and hydrogen and oxygen in the feed and effluent streams were monitored with a gas chromatograph.

Three sets of samples were taken during a 5 hour test period. It was found that after 0.5, 1 and 5 hours of operation, the concentration of hydrogen peroxide in the liquid was measured to be 0.15%, 0.23% and 0.3%, respectively. Gas chromatography measurements showed that hydrogen was totally consumed in the reactor. A mass balance calculation indicated the selectivity was approaching 100% for the first hour of reaction.

It is understood that the invention has been disclosed herein in connection with certain examples and embodiments. However, such changes, modifications or equivalents as can be used by those skilled in the art are intended to be included. Accordingly, the disclosure is to be construed as exemplary, rather than limitative, and such changes within the principles of the invention as are obvious to one skilled in the art are intended to be included within the scope of the claims.

I claim:

1. A process for manufacturing hydrogen peroxide by the direct oxidation of hydrogen and oxygen in an acidic aqueous medium, which process comprises supplying a catalyst consisting of at least one group VIII metal on a hydrophobic support, and contacting the catalyst with hydrogen and oxygen in an acidic aqueous solution at a hydrogen partial pressure from about 0.3 kPa to 5 MPa and an oxygen partial pressure of 20 kPa to 5 MPa and at a temperature from the freezing point of the aqueous medium to 60° C.

2. A process as claimed in claim 1 in which the porous hydrophobic support has a surface area of from 50 to 1,000 m$^2$/gm.

3. A process as claimed in claim 2 in which the hydrophobic support is selected from the group consisting of:
   (i) styrene divinylbenzene copolymers
   (ii) polyethylene, polypropylene or ethylene-propylene copolymers
   (iii) silica which has been rendered hydrophobic by treatment with a silane or with fluorine or a fluoridated compound
   (iv) polytetrafluoroethylene
   (v) fluoridated carbon and
   (vi) carbon which has been rendered hydrophobic by treatment with a silane or with fluorine or a fluoridated compound.

4. A process as claimed in claim 1, in which the Group VIII metal is selected from Pt, Ld, Ru, Rh, Ir and mixtures thereof.

5. A process as claimed in claim 1, in which the temperature is from −10° C. to +40° C.

6. A process as claimed in claim 1, in which the oxygen is supplied as air.

7. A process as claimed in claim 1, in which the hydrophobic support has a contact angle of at least 50°.

8. A process as claimed in claim 1, in which the hydrophobic support has a contact angle of at least 90°.

* * * * *